(12) United States Patent
Fujishima et al.

(10) Patent No.: US 8,077,327 B2
(45) Date of Patent: Dec. 13, 2011

(54) METHOD FOR CONTROLLING A MACHINE TOOL AND APPARATUS THEREFOR

(75) Inventors: Makoto Fujishima, Nara (JP); Keizo Kashihara, Nara (JP); Shizuo Nishikawa, Nara (JP)

(73) Assignee: Mori Seiki Co., Ltd., Yamato-Koriyama (JP)

( * ) Notice: Subject to any disclaimer, the term of this patent is extended or adjusted under 35 U.S.C. 154(b) by 127 days.

(21) Appl. No.: 12/410,761

(22) Filed: Mar. 25, 2009

(65) Prior Publication Data
US 2009/0244550 A1    Oct. 1, 2009

(30) Foreign Application Priority Data
Mar. 27, 2008  (JP) .................................. 2008-82493

(51) Int. Cl.
*G01B 11/14*  (2006.01)
(52) U.S. Cl. ........ 356/614; 356/615; 356/601; 356/138; 356/418; 356/237.2
(58) Field of Classification Search .................. 356/601, 356/399–401, 614, 615
See application file for complete search history.

(56) References Cited

U.S. PATENT DOCUMENTS

| | | | | |
|---|---|---|---|---|
| 4,808,000 A * | 2/1989 | Pasciak | .......................... | 356/621 |
| 6,072,583 A * | 6/2000 | Kellner | .......................... | 356/614 |
| 6,496,273 B1 * | 12/2002 | Stimpson et al. | ............. | 356/614 |
| 6,775,013 B2 * | 8/2004 | Wang | .............................. | 356/614 |
| 7,120,288 B2 * | 10/2006 | Fujishima | ..................... | 382/152 |
| 7,355,727 B2 * | 4/2008 | Turrini | .......................... | 356/615 |

* cited by examiner

*Primary Examiner* — Tarifur Chowdhury
(74) *Attorney, Agent, or Firm* — Westerman, Hattori, Daniels & Adrian, LLP (57) ABSTRACT

Relative movement in X, Y and Z axis directions is made between a main spindle and a table 6 for application in a machine tool in which a work is machined. An emitting element 12 for irradiating laser beam 11 and a photosensitive element 13 are disposed on the table 6. A measuring tool 8 with its top end being shaped as a cone form is attached to the main spindle 4. The laser beam 11 is interrupted with the cone form portion 15 of the measuring tool 8 through relative movement between the table 6 and measuring tool 8 before and after machining a work. Detection signal of interruption is generated at the moment of interruption, position is detected, operation processing is performed so that difference in X, Y and Z axes before and after machining is obtained along with values for correction. Positional coordinate values for three axis directions are detected simultaneously with a measuring device of a simple constitution by use of laser beam and values for correction such as of thermal displacement is obtained by operation processing of displacement values.

8 Claims, 7 Drawing Sheets

METHOD FOR CONTROLLING A MACHINE TOOL AND APPARATUS THEREFOR

TECHNICAL FIELD

The present invention relates to a method for controlling a machine tool such as a machining center, a lathe or the like and an apparatus therefor. More specifically the present invention relates to a method for controlling a machine tool in which relative positional deviation between a measuring device attached to a main spindle and a table is measured by use of laser beam and position is corrected and relates to an apparatus therefor.

BACKGROUND

Techniques for detecting positions of an activated main spindle in a NC machine tool such as a machining center, for detecting positions of an activated feeding system such as a table or the like and measuring devices employed for those are known. Measurement of positions in these cases is necessary, e.g., for correcting thermal deformation or the like occurring in the machine tool during machining process. Measurement is also made for checking figures, abrasion or the like. Objects for measurement in these cases are tool positions of the main spindle, tool lengths, tool figures or a feeding system such as a table.

Measurement is carried out in a machine tool during operation mainly concerned with whether there is or is not thermal deformation, abrasion, breaking, etc. generated by the machining action performed in the machine tool. Thermal deformation among these is specifically concerned with machining precision because it has a direct effect on the relative position between a tool and a work by generating positional deviation. In many cases main spindles specifically suffer from thermal deformation due to high speed operation in recent years. Also in the feeding system relative positional deviation is generated between itself and the main spindle under the thermal effect of a ball screw. Further, deviation of relative position between the main spindle and the table occurs during machining because of combination of various factors such as deformation generated by attachment of a tool, abrasion of the tool or the like.

For these reasons, measurement has been made for related portions and positional correction of tools or the like has been made according to the result of measurement. A typical method for measuring position is one by use of a touch sensor. This method is such that a touch probe device is attached to a main spindle, position is measured by causing the touch probe device to make contact with a work through relative movement between the work and an spindle, measurement of position is performed and final positioning is made by NC control. This method is applied in many cases and a technique for correcting position as an example for correction of thermal deformation is known in which correction of thermal displacement based on the measured temperature and automatic centering by making zero correction of varied coordinate with a touch sensor attached to the main spindle are combined so as to complement each other at determined times (see e.g. Japanese Patent Laid-open H6-304846).

A technique for correcting totally thermal displacement both of a feed screw in a machine tool and a work, that is, a technique in which thermal displacement of a ball screw is compared with the absolute standard by an invar material with little thermal expansion and a touch sensor is used for making correction based on the comparison, so that correction of thermal displacement in a work is made through control based on the reference temperature is known (see e.g. Japanese Patent Laid-open 2006-212765). The structure of a touch probe for three dimensional measurement concerned with these and a technique for extracting detection signal are also known (see e.g. Japanese Patent Laid-open H6-185911).

Recently it has also become known to use noncontact measuring devices. As an example for this, a technique for detecting position is known in which measuring means is caused to make approach to laser beam and the position at the moment when the laser beam is interrupted by the measuring device is measured. Relating to this, a technique is known in which a measuring device by use of laser beam is mounted on a turn table capable of indexing by 90 degrees on the table of a machine tool and a tool is made to approach the laser beam so that the position of axis line is measured in the situation where the position of axis line is changed by 90 degrees (see e.g. Japanese Patent Laid-open H10-138097).

This method corresponds to a technique for obtaining the position by calculating the difference from the reference value obtained by preliminary measurement. Further, as a technique which allows the top end position of the tool during rotation in a machine tool, the diameter of the tool, the length of the tool or the like to be measured quickly, a technique for measurement is known in which an optical measuring device emitting laser beam is placed at a location on the table where no obstruction occurs for machining operation and then measurement is performed (see e.g. Japanese Patent Laid-open H11-138392). As a technique concerned specifically with correction of thermal displacement, also a technique is known in which variation is obtained by use of the temperature measured with a thermometer and coefficients for correction are obtained so as to perform correction (see e.g. Japanese Patent Laid-open H5-116053). This is not a technique in which numerical values are obtained physically with a measuring device provided on the body of a machine tool but is an example of a technique for postulating the position based on the measurement of temperature.

Specifically as techniques for measuring position by use of laser beam, techniques are already known in which approach to the laser beam is made at a right angle as mentioned above. However, those techniques in the present state are such that measurement is made for a spindle moving in an axial direction, while, for coping with measurement by interrupting the same laser beam with a thing moving in the direction of another axis, the direction of the laser beam is changed by turning the table by 90 degrees as mentioned above or another laser beam is provided for another axis.

Thus, respective measurement operations have suffered from inefficiency, which has caused efficiency of machining to be lowered. Further, in case of using a touch sensor the effect of attached dirt can not be neglected and so it has been desired to secure a circumstance in which measurement is allowed to be performed. Especially the thermal displacement of a feeding system due to the thermal displacement of the main spindle and the ball screw is a factor which can not be neglected. The present invention is devised in order to solve the above mentioned conventional problems and attains the following objects.

SUMMARY OF THE INVENTION

It is an object of the present invention to provide a method for controlling in machine tool and an apparatus therefore in which positional coordinates in three axis directions are detected at the same time in the form of displacement by use of a position measuring equipment with a simple constitution employing a single laser beam and operation processing is performed efficiently and quickly to obtain values for correction.

In the method for controlling in machine tool and the apparatus therefor according to the present invention, position can be detected by interrupting a single laser beam with a measuring tool with a portion shaped as a cone form. Consequently, positional coordinates in the three axis directions for X, Y and Z axes can be detected individually or simultaneously, so that operation processing is performed based on the coordinate values to obtain values for correction easily and quickly. As a result, a machine tool with high performance has been realized in which these values for correction are fed back to the driving system.

In the first aspect of the present invention, a method for controlling a machine tool is provided in which a work mounted on a table is machined through relative movement in X, Y and Z axis directions between the table and a main spindle, said method comprising:

a step of irradiating laser beam from an emitting element towards an photosensitive element provided on the table respectively, a step of interrupting the laser beam by making a measuring tool attached to the main spindle move towards the laser beam in the direction substantially at right angle therewith a relative movement between the main spindle and the table, a step of delivering detection signal of interruption when the measuring tool has interrupted the laser beam, a step of measuring coordinate value for each of said three axes based on said detection signal of interruption, and a step of obtaining displacement value between the main spindle and the table through operation processing of the difference between said measured coordinate value for each of the three axes and the measured coordinate value for each of the three axes measured before similarly and update values for correction of positions of the main spindle and/or the table based on said obtained displacement value, wherein said measuring tool is formed with the interrupting portion of the laser beam shaped as a portion of circular cone form and said machine tool is controlled with correction of position being performed based on the obtained data.

In the second aspect of the present invention, the method for controlling a machine tool according to the first aspect is so arranged that at least two pairs of said emitting element and said photosensitive element are provided and said laser beams are irradiated in the direction parallel to the upper face of said table respectively so as to cross each other substantially at center of the table which is viewed as a plane.

In the third aspect of the present invention, the method for controlling a machine tool according to the first aspect is so arranged that each pair of said emitting element and said photosensitive element is provided as a single unit and plurality of units of said emitting element and said photosensitive element are provided on the upper face of the table.

In the fourth aspect of the present invention, the method for controlling a machine tool according to the first aspect is so arranged that said measuring tool is formed with the interrupting portion of the laser beam shaped as a portion of circular or polygonal cone form.

In the fourth aspect of the present invention, the method for controlling a machine tool according to any of the first to third aspects is so arranged that said step of interrupting the laser beam is arranged so that said relative movement is made for each one of said laser beams in X axis direction, Y axis direction or direction combined thereof, said measuring tool interrupts said laser beam from one side in a direction, the position at the moment of interruption is measured, said measuring tool further interrupts said laser beam in said direction from the opposite side to said one side and the position at the moment of interruption is measured.

In the fifth aspect of the present invention, the apparatus for controlling a machine tool is provided in which a work mounted on a table is machined through relative movement in X, Y and Z axis directions between the table and a main spindle, said apparatus for controlling a machine tool comprising:

measuring means containing an emitting element and a photosensitive element provided on said table in which laser beam is irradiated from said emitting element towards said photosensitive element, a measuring tool which is formed with an interrupting portion of the laser beam shaped as a portion of circular cone formed and is attached to said main spindle and can move towards the laser beam in the direction substantially at right angle therewith with a relative movement between the measuring tool and the table and interrupt said laser beam, delivering means of detection signal of interruption generated at the moment when said measuring tool has interrupted said laser beam, position detecting means for detecting coordinate values for said respective three axes upon receiving said detection signal of interruption, and operating means in which operation processing of the difference between said measured coordinate value for each of the three axes and the measured coordinate value for each of the three axes measured before similarly is performed so as to obtain a displacement value between said main spindle and said table and the values for correction of positions of the main spindle and/or the table based on said obtained displacement value, wherein said machine tool is controlled with measurement of position being performed based on the obtained data.

In the sixth aspect of the present invention, the apparatus for controlling a machine tool according to the fifth aspect is so arranged that at least two pairs of said emitting element and said photosensitive element are provided and said laser beams are irradiated in the direction parallel to the upper face of said table respectively so as to cross each other substantially at center of the table which is viewed as a plane.

In the seventh aspect of the present invention, the apparatus for controlling a machine tool according to the fifth aspect is so arranged that each pair of said emitting element and said photosensitive element is provided as a single unit and plurality of units of said emitting element and said photosensitive element are provided on the upper face of the table.

In the ninth aspect of the present invention, the apparatus for controlling a machine tool according to the sixth aspect is so arranged that said measuring tool is formed with the interrupting portion of the laser beam shaped as a portion of circular or polygonal cone form.

In the eigth aspect of the present invention, the apparatus for controlling a machine tool according to any of the fifth to seventh aspects is so arranged that in the course of interruption of said laser beam said relative movement is made for each one of said laser beams in X axis direction, Y axis direction or direction combined thereof, said measuring tool interrupts said laser beam from one side in a direction, the position at the moment of interruption is measured, said measuring tool further interrupts said laser beam in said direction from the opposite side to said one side and the position at the moment of interruption is measured.

DETAILED DESCRIPTION OF EMBODIMENTS

Figure 1:
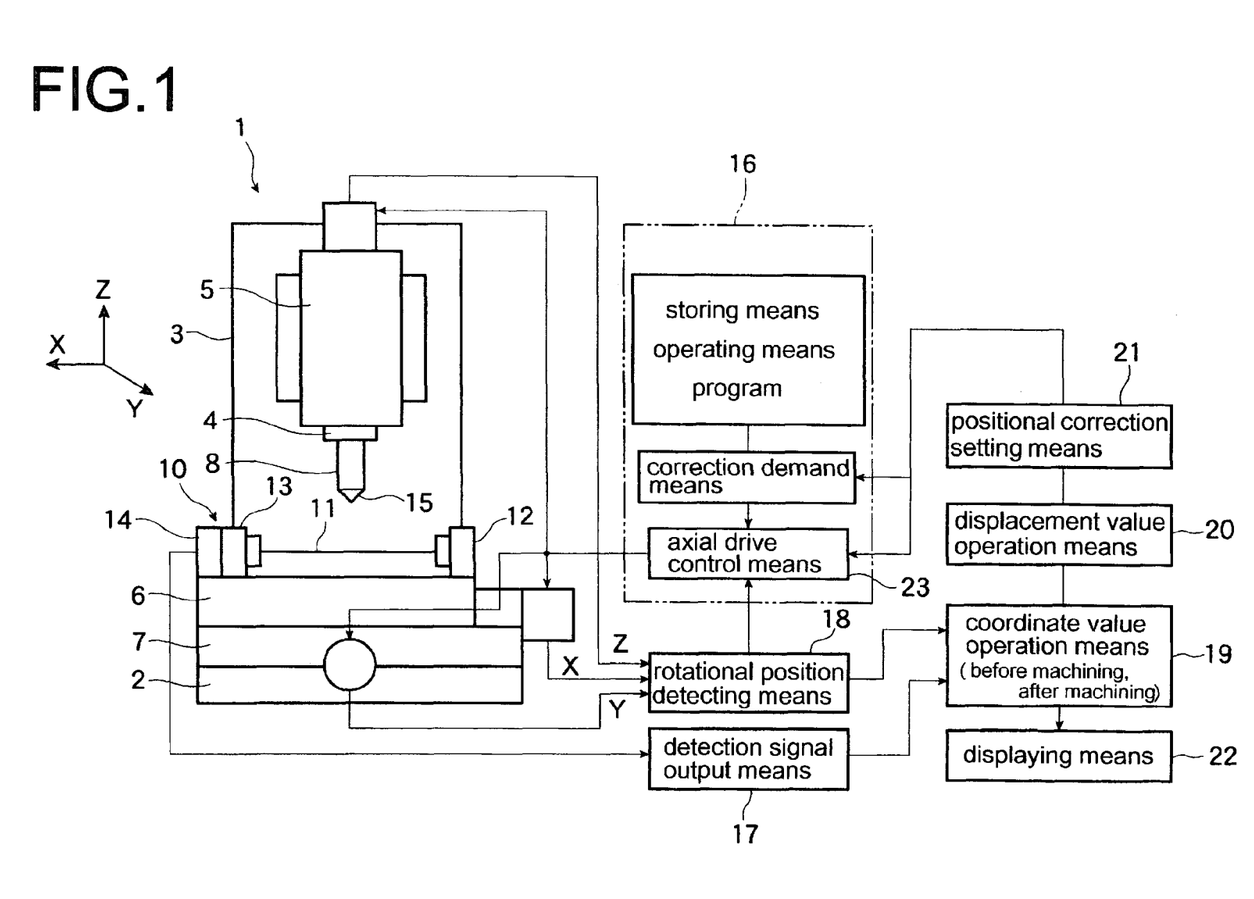
FIG. 1 is a block diagram showing the constitution of an NC machine tool equipped with a position measuring device.

Preferred embodiments according to the present invention will be explained referring to drawings below. FIG. 1 is a block diagram showing the constitution of an NC machine tool equipped with a position measuring device. As shown in FIG. 1, the main body 1 of an NC machine tool has a main spindle head 5 disposed therein which holds a main rotatable spindle 4 and is guided in Z axis direction along the column 3 provided vertically on the base 2. Further, the main body has a table 6 disposed against the main spindle head 5 as well as securing a work thereon and a saddle 7 guiding the table 6 in X axis direction, the saddle 7 being guided in Y axis direction along the base 2. Consequently, the table 6 can move in X and Y axes direction.

Each of the main spindle head 5, table 6 and saddle 7 is driven by servo motors with NC control based on the command from NC equipment 16 to move in three axis directions. The NC equipment provided with various programs numerically controls the machine tool by use of storing device, operating device or the like. The servo motor has a rotational position detecting means 18 attached thereto so as to detect axial displacement. The constitution of main portion of the machine tool in which driving is made in three axes is only exemplified here and the present invention is not limited by the specific embodiment. For example, the present invention can be also applicable in case of a machining center of a columnar type. In such a case, the table 6 is fixed and the main spindle 5 in turn is driven in the X, Y and Z axis directions.

The main spindle head 5 has a main rotatable spindle 4 contained therein rotatably and a machining tool (not shown) for machining a work fixed on the table 6 is attached to the lower end of the main rotatable spindle 4. The main rotatable spindle 4 for securing the machining tool is also allowed to make a measuring tool 8 according to the present invention attached thereto. This measuring tool 8 is so arranged to be changed for another by use of automatic tool changing device (ATC, not shown) disposed at the side of the main spindle head 5 and also exchange for a machining tool is possible. When a machining tool is attached to the main rotatable spindle 4, the machining tool is moved relative to the work fixed on the table 6 so as to make machining. In this, the measuring tool 8 may be attached not to the main rotatable spindle 4 but to a fixed base of the machine tool such as a bed.

Figure 2:
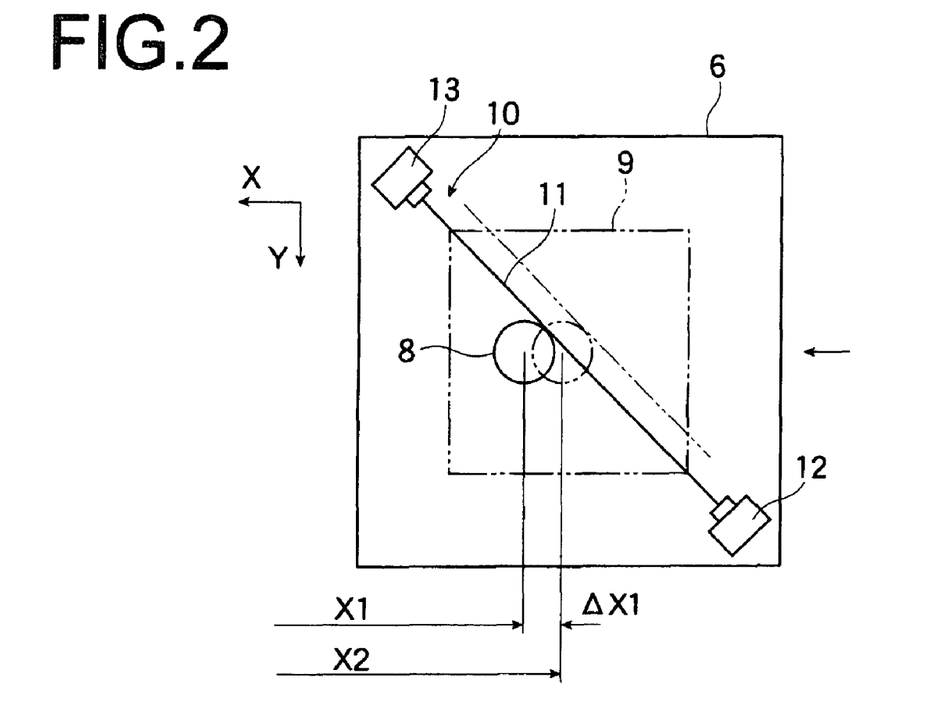
FIG. 2 is a view showing the state where laser beam on a table is interrupted with a measuring tool through relative movement in X axis direction between the laser beam and the measuring tool.

As shown in FIG. 2, a measuring device 10 with laser beam 11 is disposed outside the machining area 9 of the work on the table 6 and secured thereto. The measuring device 10 contains an emitting element 12 of laser and a photosensitive element 13. The emitting element 12 and photosensitive element 13 of the measuring device 10 are disposed outside and at both sides of the machining area 9 of the work on the table 6 so that the optical axis of laser beam 11 may be positioned on the horizontal diagonal line of the substantially rectangular table 6. In an arrangement according to this embodiment, the measuring device is disposed so that the optical axis may be positioned on the diagonal line at 45 degrees to X axis direction. The laser beam 11 is emitted from the emitting element 12 disposed at one end of the table 6 and directed to the photosensitive element 13 disposed on the other confronting end on the diagonal line of the table, so that the laser beam is irradiated with its optical axis at 45 degrees to X and Y axes respectively in the example shown.

Consequently, this measuring device 10 is movable in X and Y axis directions along with the table 6. The table is movable in X and Y axis directions as shown. Further, FIG. 2 shows the measuring tool 8 which occupies the position in X and Y coordinates when the laser beam 11 is interrupted by approach from one direction. As the table is movable, wiring cables (not shown) for the light emitting element 12 and photosensitive element 13 are provided between the table 6 and the fixed portion such as the base 2 so that relative movement can be made during the movement of the table 6 in X or Y axis directions.

An electronic circuit 14 for putting out detection signal of interruption when laser beam 11 has been interrupted is incorporated into the measuring device 10 (see FIG. 1). On the other hand, the measuring tool 8 for measuring position is attached to the main rotatable spindle 4, as mentioned above. The measuring tool 8 becomes attached to the main rotating spindle 4 after being extracted from the tool magazine of an automatic tool changing equipment only when measurement is required. The top end of the measuring tool 8 is shaped as a conical portion 15 which acts as interrupting means of laser beam when the laser beam 11 is to be interrupted by the measuring tool 8 for measurement.

When the measuring tool 8 has interrupted the laser beam 11, detection signal of interruption is put out via a detection signal output means 17. This detection signal of interruption is delivered to an NC control equipment 16 in which operation of the signal is made along with the signal from the rotational position detecting means 18 by coordinate value operation means 19 and displacement value operation means 20 and the result of operation is displayed by the displaying means 22 while feedback as a value for correction to the feeding system is made by positional correction setting means 21, as explained later. These results of detection and operation are displayed by the displaying means 22.

In the NC control equipment 16, processing of operation including processing of these results of measurement is made based on the measured coordinate values and the values are sent as values for correction to an axial drive control means 23 so that position control for each axis mentioned above is performed corresponding to correction command. While the equipment for measuring position is constituted as above mentioned, a method for measuring position will be explained below. The measuring device 10 by use of laser beam 11 is secured to the table 6 as mentioned above. On the face of the table 6 is fixed a work which is machined within the work machining area.

The work and measuring device 10 coexist on the face of the table 6, while measurement by use of the laser beam 11 is performed before securing of the work, that is, before machining of the work, during machining of the work (during interruption of machining) or after having machined the work. The measuring device 10 by use of the laser beam 11 naturally does not function when the work is under machining. In this case, protection means such as a cover is applied to the measuring device 10, because cut out chips, coolant or the like are produced during the machining process. While measurement after having machined the work is performed basically after having removed the work, in case of a work such as a plate-like article, height of which is below the irradiated position of laser beam, measurement is possible without removing the work, because the measuring tool 8 does not interferes with the work.

Referring to 'before machining' and 'after having machined' in the present invention or in its embodiments, there are various types of case, for example, a case where measurement is performed before or after machining of a single work, a case where measurement is performed before and after machining of a single work as well as during the process of machining when machining of the single work requires long time, a case where measurement is performed for plurality of works before and after machining and further a case where measurement is performed just before actual machining after starting of the machine tool. Consequently, 'before machining' and 'after having machined' in the present invention or in its embodiments have a meaning that measurement is performed with time intervals and do not have a meaning concerned with whether the work is actually machined or not.

When measurement is to be performed, a measuring tool 8 is taken out and attached to the main rotatable spindle 4 with tool changing operation. The measuring device 10 is brought into the situation where the emitting element 12 and photosensitive element 13 are activated and laser beam is emitted. In this situation the coordinates as reference values before machining are measured at first. The measurement is performed by causing the table 6 to move with the measuring tool 8 held at the determined position, making approach to the laser beam 11 and interrupting the laser beam 11 with the conical portion 15 of the measuring tool 8. At the moment when the conical portion 15 of the measuring tool 8 has come to interrupt the laser beam 11, a detection signal of interruption is put out. Explanation will be made by use of an example applied for X axis in order to make the measurement understood easily. The main head 5 moves to such a position in Z axis direction that the measuring tool 8 of the main rotatable spindle 4 can cross and interrupt the laser beam 11.

In the next, the table 6 is caused to move in the direction as shown in FIG. 2 with the Y axis coordinate of the saddle 7 being of a determined value. The position, at which the measuring tool 8 has interrupted the laser beam 11 and generated detection signal of interruption in the course of movement of the table 6, is stored as the reference coordinate value of the center position of the measuring tool 8 before machining X1 in the NC control equipment 16. After machining, the table 6 is caused to move similarly with Y and Z axes being in the same condition as before machining and the position, at which the measuring tool 8 has interrupted the laser beam 11 and generated detection signal of interruption in the course of movement of the table 6, is detected as measured coordinate value X2 of the center position of the measuring tool 8 and delivered to the operation processing device where operation processing is performed for comparing with the reference coordinate before machining and variable $\Delta X1=X2-X1$ is obtained. In FIG. 2, the solid line for the laser beam 11 shows the detected position before machining and the two dotted chain line shows the detected position after machining.

Figure 3:
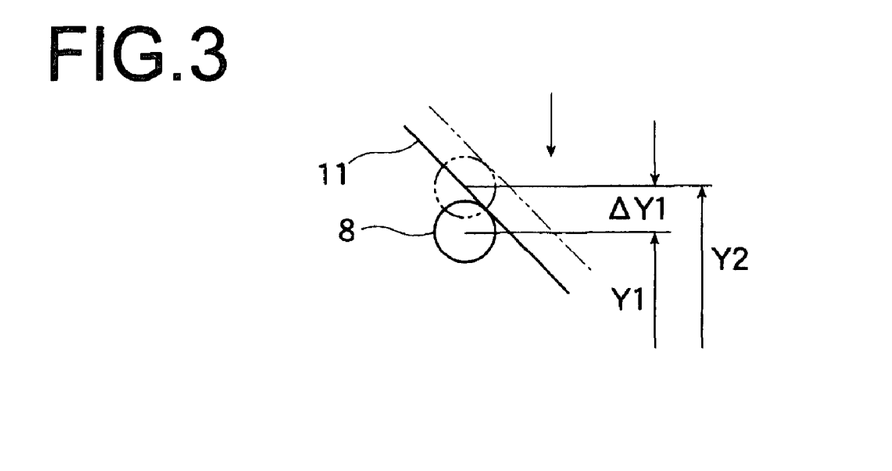
FIG. 3 is a view showing the state where laser beam on a table is interrupted with a measuring tool through relative movement in Y axis direction between the laser beam and the measuring tool.

This corresponds to the deviation of X axis between before machining and after machining. This deviation is delivered to a servo motor as a value for correction, so that position in X axis is corrected with NC control. Such measurement is performed similarly for Y axis so that movement in the direction shown by arrow in FIG. 3 is made and value of displacement is obtained as $\Delta Y=Y2-Y1$. In the next, the way to obtain the value of displacement in Z axis direction will be explained. The deviation in Z axis direction can be obtained from measured value for X axis direction or Y axis direction.

Figure 4:
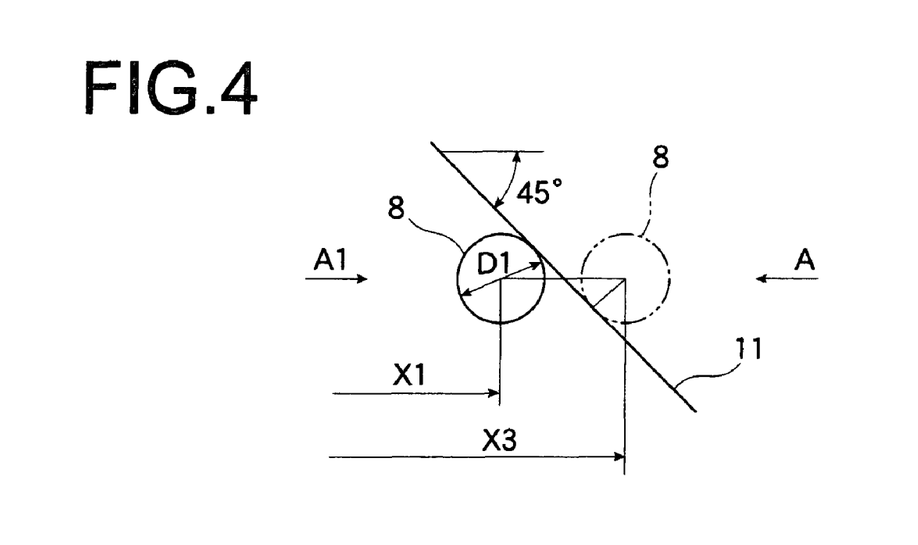
FIG. 4 is a view showing the state where laser beam on a table is interrupted with a measuring tool through movement of the laser beam relative to the measuring tool in X axis direction from direction A and from direction A1 before machining.

Explanation will be made for X axis direction. As shown in FIG. 4, the inner diameter of the conical form at the positional coordinate occupied by the measuring tool 8 having interrupted the laser beam 11 before machining is obtained at first through operation. In FIG. 4, the inner diameter of conical form of the measuring tool 8 is obtained from the difference between the X coordinate value X1 of the position at the moment when the laser beam 11 has been interrupted through approach in the direction A on the table 6 and the X coordinate value X3 of the position at the moment when the laser beam 11 has been interrupted through approach in the direction A1 on the table 6, according to the following equation. The inner diameter D1 of the conical form at the positional coordinate when the laser beam has been interrupted is obtained as: $D1=(X3-X1)/\sqrt{2}$, considering that the optical axis of the laser beam makes an angle of 45 degrees with X or Y axis.

Figure 5:
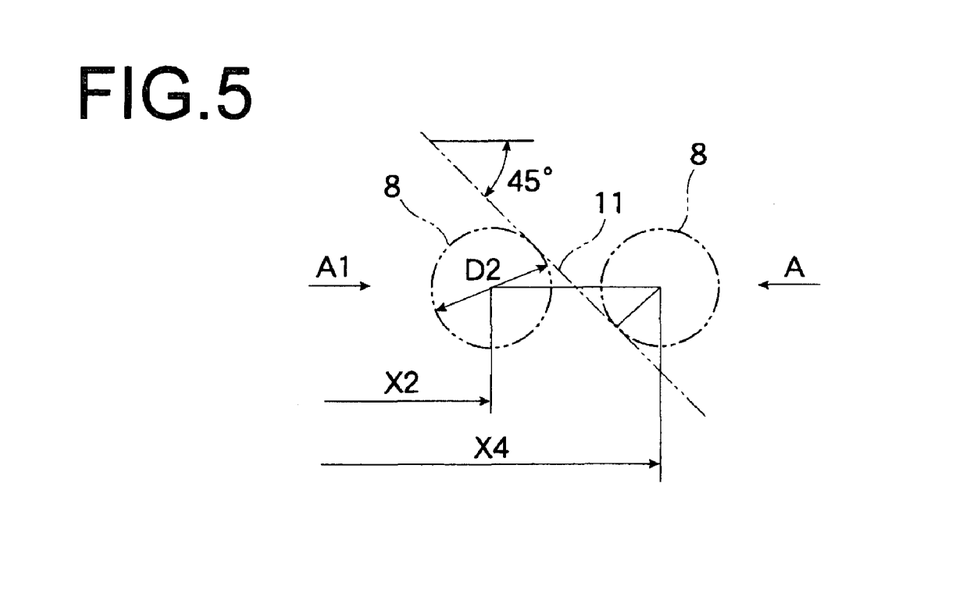
FIG. 5 is a view showing the state where laser beam on a table is interrupted with a measuring tool through movement of the laser beam relative to the measuring tool in X axis direction from direction A and from direction A1 after machining.
Figure 6:
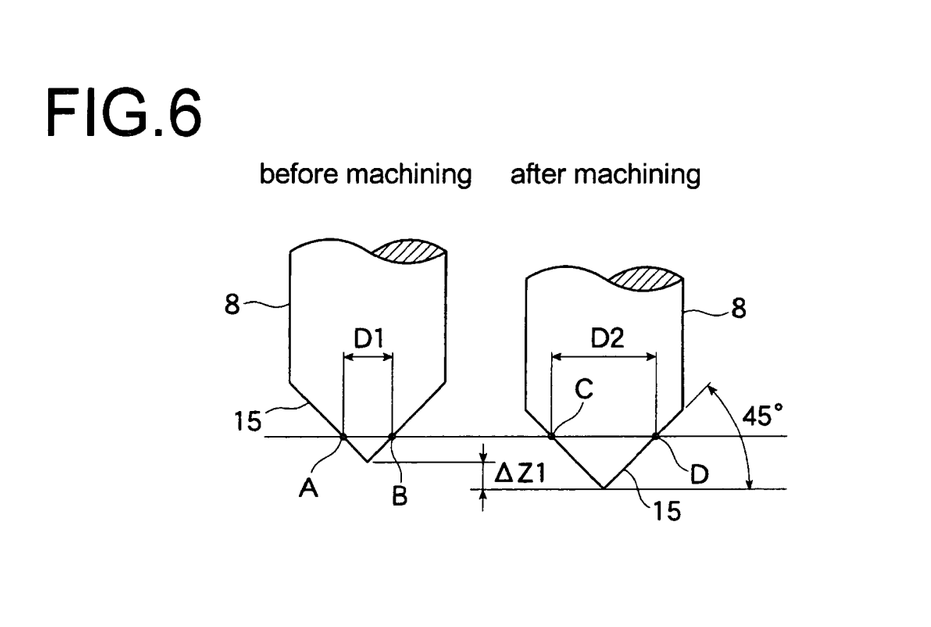
FIG. 6 is a view showing means for obtaining displacement value in Z axis direction ΔZ1 illustrated as for before machining and after machining.

Similarly as shown in FIG. 5, the inner diameter of conical form is obtained from the coordinate value X2 in the direction A and the coordinate value X4 in the direction A1 after machining as $D2=(X4-X2)/\sqrt{2}$. From the result, because the outer face of the conical portion 15 of the measuring tool 8 is inclined at 45 degrees as shown in FIG. 6, displacement value in Z axis direction is obtained as: $\Delta Z1=(D2-D1)/2$. In FIG. 6, the positions shown by symbols A, B, C and D are those at which the laser beam is interrupted respectively. That is, the symbols A and B show the positions of interruption before machining. The symbol A shows the position at which the laser beam is interrupted by the measuring tool 8 in the course of movement of the laser beam 11 from left to right in FIG. 4 or 5 (in the direction A1).

The symbol B shows, in an imaginary view, the position at which the laser beam is interrupted by the measuring tool 8 in the course of movement of the laser beam 11 from right to left in FIG. 4 or 5 (in the direction A). The symbols C and D, showing the position of interruption after machining, are shown in an imaginary view similarly as mentioned above as to FIG. 5. The displacement in Z axis direction can be obtained similarly by use of coordinates in Y axis direction. Explanation has been made above as to the way in which coordinate values are measured in case of movement parallel to axis directions both for X and Y axes and either of three axes containing X, Y and Z are obtained. This explanation has been made for an relatively simple embodiment so as to easily understand the present invention.

Figure 7:
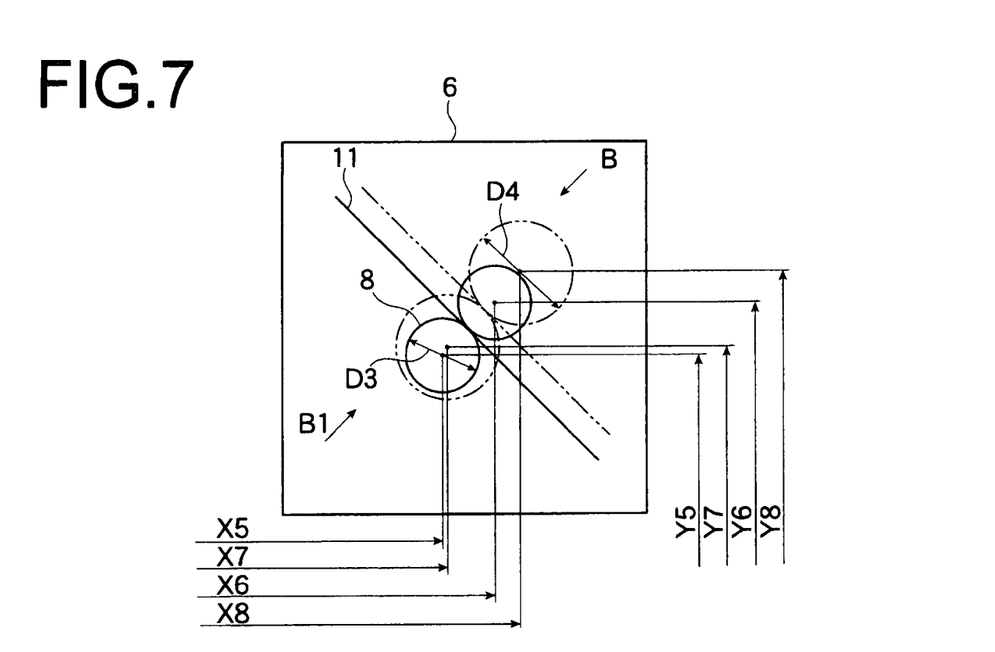
FIG. 7 is a view showing the state where laser beam on a table is interrupted with a measuring tool through movement of the laser beam relative to the measuring tool from directions B and B1 at right angle to the laser beam by simultaneous driving in both X and Y axis directions.

In the next, the way for measurement will be explained as to the case where simultaneous control for both X and Y axes is performed and movement in the direction at right angle to the optical axis of the laser beam is made so as to interrupt the laser beam. As shown in FIG. 7, the table 6 is caused to move relatively so as to make approach to the optical axis of the laser beam 11 in the direction at right angle therewith through simultaneous control with the feed rate for X and Y axes being of a same value and the laser beam 11 is interrupted by the measuring tool 8. This approach is made in the direction B and in the direction B1 as directions of movement of the table 6 relative to the measuring tool 8. As to the laser beam 11, the solid line shows the detected position before machining and the two dotted chain line shows the detected position after machining.

Figure 8:
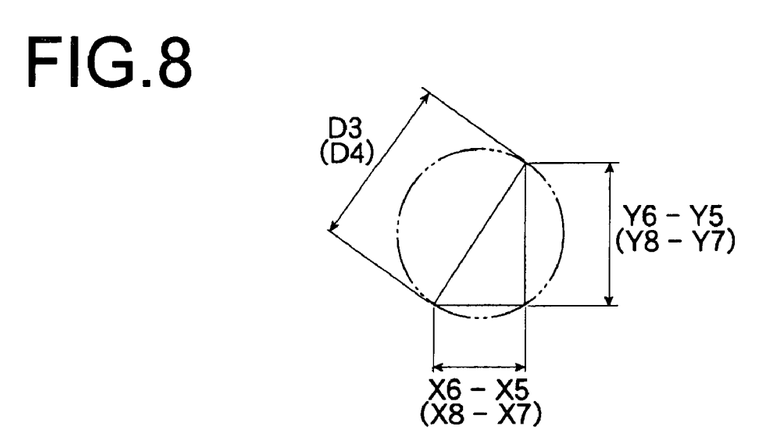
FIG. 8 is a view explaining the way for obtaining the inner diameter of the conical portion of a measuring tool at the position of interruption of laser beam before machining and after machining in the case of simultaneous driving in both X and Y directions.

At first, the coordinate value of the center of the measuring tool 8 at the position of interruption before machining is obtained such that coordinate value in A1 direction is (X5, Y5) and coordinate value in B1 direction is (X6, Y6) Similarly in the next, coordinate value after machining is obtained such that coordinate value in B direction is (X7, Y7) and coordinate value in B1 direction is (X8, Y8). From this result, following equations are derived based on the constitution shown in FIG. 7, FIG. 8 and FIG. 9 with the top angle of the conical form of the measuring tool 8 being a.

Figure 9:
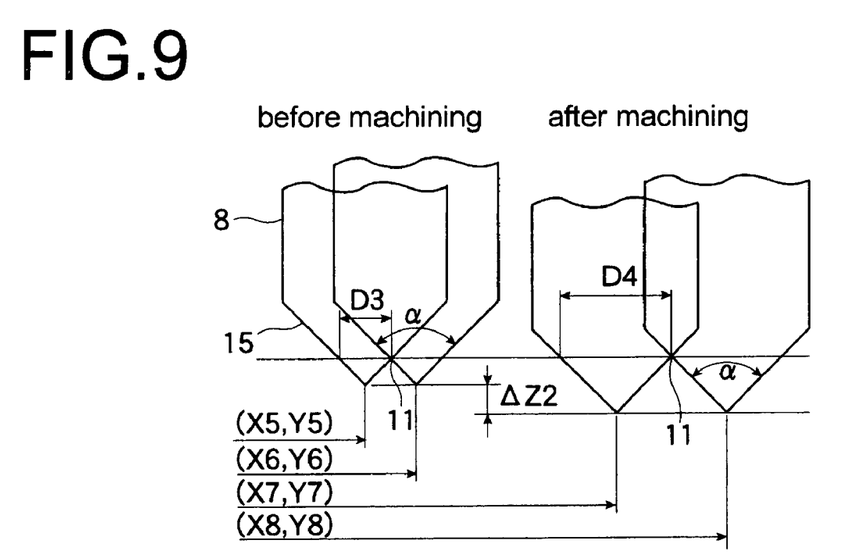
FIG. 9 is a view showing means for obtaining displacement value in Z axis direction ΔZ2 illustrated as for before machining and after machining in the case of simultaneous driving in both X and Y directions.

The displacement in X axis direction between before machining and after machining is obtained so as to be ΔX2=(X7−X5) for direction B and ΔX3=(X8−X6) for direction B1, while the displacement in Y axis direction between before machining and after machining is obtained so as to be ΔY2=(Y7−Y5) for direction B and ΔY3=(Y8−Y6) for direction B1. In the next, the displacement in Z axis direction is obtained from these coordinate values as follows. FIG. 9 shows an imaginary view for obtaining the center position of the measuring tool 8 making relative movement with the position of the laser beam being as reference point. At first, the inner diameter of the conical form before machining is expressed as $$D3 = \sqrt{(X6-X5)^2 + (Y6-Y5)^2} \quad \text{(Eq.1)}$$

and the inner diameter of the conical form after machining is expressed as $$D4 = \sqrt{(X8-X7)^2 + (Y8-Y7)^2} \quad \text{(Eq.2)}$$

Consequently, the displacement in Z axis direction is obtained so as to be $$\Delta Z2 = (D4 - D3)/2\tan\alpha/2 \quad \text{(Eq. 3)}$$
$$= \frac{\sqrt{(X8-X7)^2 + (Y8-Y7)^2} - \sqrt{(X6-X5)^2 + (Y6-Y5)^2}}{2\tan\frac{\alpha}{2}}$$

In such a manner, the displacement values for X, Y and Z axes can be obtained simultaneously through operation processing by movement of the table alone, if the angle α of the conical form of the measuring tool is determined. Then the data can be delivered instantly to the driving system as values for correction. These operation of measurement can be made automatically. The above explanation is such that the difference of coordinate values between before machining and after machining is obtained under the same condition. In this, it is mainly and basically considered to obtain the deviation of position. Consequently, thickness of the laser beam is not considered in this embodiment.

Figure 10:
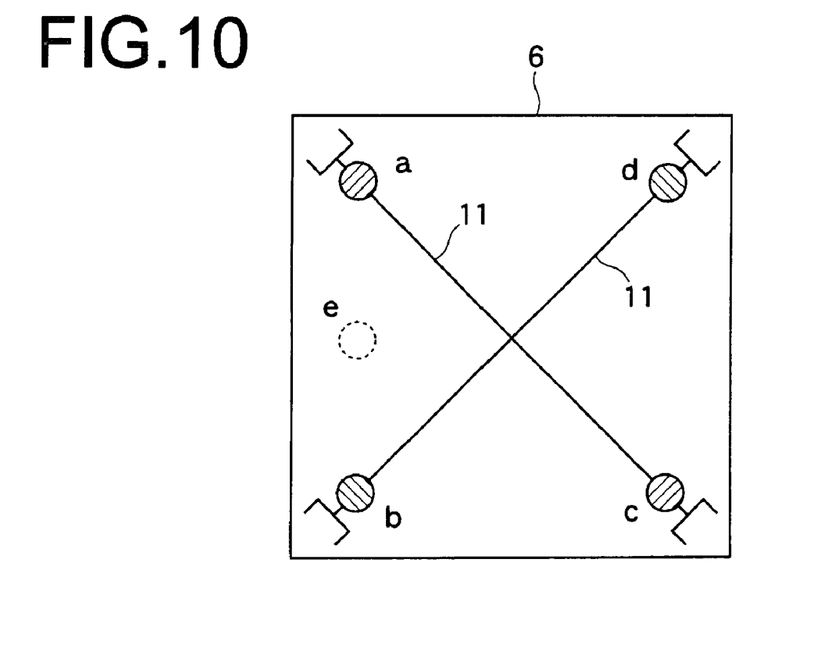
FIG. 10 is a view showing another embodiment where laser beam devices are disposed so that their laser beams cross each other on the table.

It has been explained heretofore as to obtaining values for correction with operation processing with the measured position of the measuring tool being at a specified position, while the tendency of displacement of XY plane for X axis direction and for Y axis direction can be detected with measurement being performed at plurality of various positions. So, explanation will be made about this in the next. FIG. 10 shows another embodiment, in which the laser beams are disposed so that their optical axes cross each other and measurement is performed in the positions a, b, c and d in the same manner as mentioned above so that displacement values in respective positions can be obtained.

As for a position that the laser beams 11 do not pass through such as the position e, the difference is calculated from the coordinates values at the positions a and b and then the displacement value for the position e is obtained by calculating the coordinate value proportionally. Making similar operation for another position, displacement value for any position can be obtained. If there is no variation in these displacement values, the face of the table 6 is taken as to be held in even and horizontal state relative to the measuring tool 8. However, if there is a difference among the displacement values, the face of the table 6 is taken as to be not in horizontal state but in inclined state. While it is not possible to correct the whole movement of axis in a manner of correction in this case, correction can be made with correction of dimension in the machining program according to variation of the face of the table along the machined form.

Figure 11:
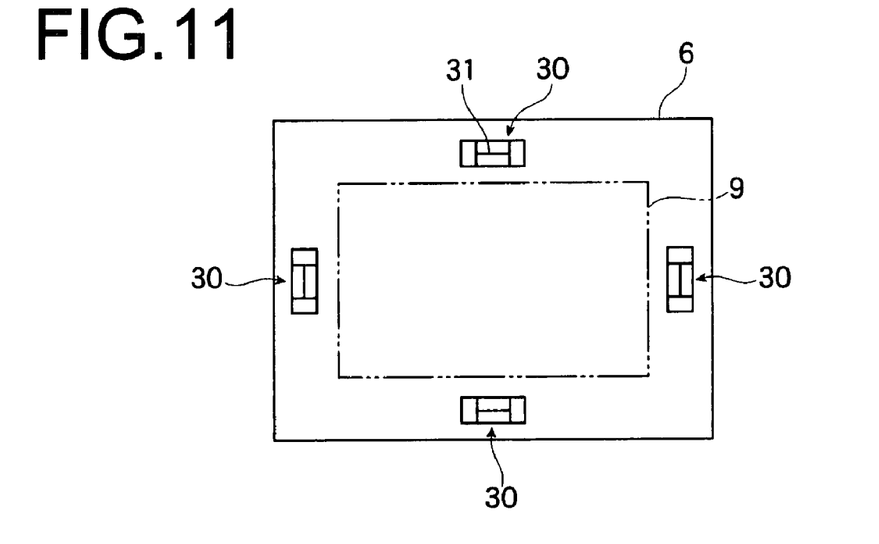
FIG. 11 is a view showing still another embodiment where plurality of laser beam devices are disposed on the table with elements of each pair confronted and their optical axis parallel to X or Y axis.

FIG. 11 shows yet another embodiment for the laser beam device wherein plurality of laser beam devices 30, each of which comprises an emitting element and a photosensitive element, are disposed on the periphery of the table 6 so that their optical axes are along the direction of movement. In this embodiment, two sets of laser beam devices 30 are disposed on both sides confronted each other in X axis direction on the table 6 with the work machining area 9 being between them and another two sets of laser beam devices are disposed similarly in Y axis direction.

In this embodiment, steady condition can be attained for the beams of optical axes of the laser because the optical axes are short, while the examples mentioned above are explained under the prerequisite which satisfies a certain condition where the beam of the optical axis of the laser can be measured. Because the position for measurement can be specified in this embodiment, laser beam devices with short optical axes 31 can be provided. Thus, it is possible to employ laser beam devices 30 with compact size and at low cost.

The disposition of two sets of laser beam devices 30 confronted each other makes it possible to detect the inclination of the table 6. The way for obtaining positional coordinate values per se is similar to one in the embodiments explained above. However, because plurality of laser beam devices are provided in this embodiment, the same condition must be held between the plurality sets of laser beam devices 30. Consequently, it is necessary to adapt the initial setting such as setting in the direction of height for obtaining the reference value.

Figure 12:
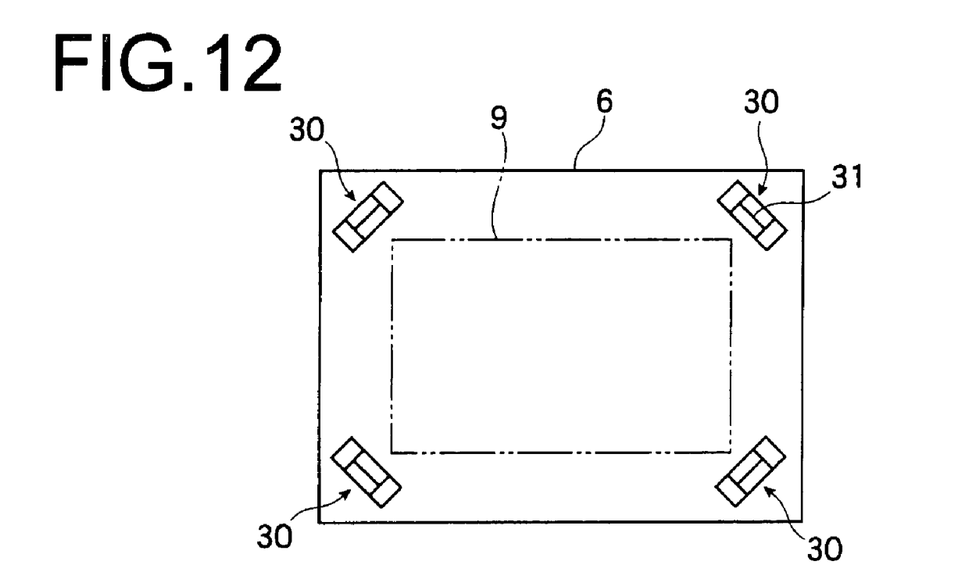
FIG. 12 is a view showing still another embodiment where plurality of laser beam devices are disposed on the table and a measuring tool crosses and interrupts the laser beams by simultaneous driving in both X and Y directions.

With the disposition of laser beam devices shown in FIG. 11, detection of position can be performed by causing the measuring tool 8 to cross and interrupt the laser beam 31 in the direction at right angle when the table 6 moves in X or Y axis direction individually. The disposition shown in FIG. 12 is an example in which two sets of laser beam devices 30 are disposed at both end positions confronted each other on the table 6 with the work machining area 9 being between them. In this example, detection of position can be performed by causing the measuring tool 8 to cross and interrupt the laser beam 31 in the direction at right angle when the table 6 is controlled to move in X and Y axis directions simultaneously. Because the measuring tools 8 shown in FIGS. 11 and 12 are of the same form as ones mentioned above, detection of position, operation, processing of correction may be performed before and after machining in a manner mentioned above.

As explained heretofore, difference of coordinate values between before machining and after machining can be obtained easily and simultaneously for X, Y and Z axes through measurement by use of laser beam. This makes it possible to correct position in the course of machining process. Actual data can be directly reflected on correction of position especially in correction of thermal displacement so that machining of works with high precision can be maintained.

While the present invention has been explained above relating to embodiments thereof, it is not necessary to say that the present invention is not limited by those explained for the embodiments. For example, while it has been explained that the main spindle of the above mentioned NC machine tool 1 moves only in one direction, the main spindle can be such that it is fixed or moves in one or more axis direction. Further, while the table has been explained as to movable in two or more axis directions, the table can be such that it is fixed or moves in one or more axis direction. In short, an NC machine tool may be taken as suitable in which relative movement in X, Y and Z axis directions is made between the main spindle and the table of the NC machine tool.

Further, while the optical axis of laser beam has been explained with an example with the direction of disposition being 45 degrees, it is not necessary to say that direction of disposition of the optical axis of laser beam is not limited by this. Yet further, while the explained form of the top end of the measuring tool 8 is conical, it may be of polygonal cone form such as triangular cone, square cone or the like, because coordinate position in axis direction can be calculated for such polygonal cones. In the meaning of this, the form of the top end of the measuring tool 8 may be of any form which makes it possible to calculate coordinate position in optical axis direction of irradiation at the moment when laser beam is interrupted.

What is claimed is:

1. A method for controlling a machine tool in which a work mounted on a table is machined through relative movement in X, Y and Z axis directions between the table and a main spindle, comprising:
    a step of irradiating laser beam from an emitting element towards an photosensitive element provided on the table respectively,
    a step of interrupting the laser beam by making a measuring tool attached to the main spindle move towards the laser beam in the direction substantially at right angle therewith through a relative movement between the main spindle and the table,
    a step of delivering detection signal of interruption when the measuring tool has interrupted the laser beam,
    a step of measuring coordinate value for each of said three axes based on said detection signal of interruption, and
    a step of obtaining displacement value between the main spindle and the table through operation processing of the difference between said measured coordinate value for each of the three axes and the measured coordinate value for each of the three axes measured before similarly and update values for correction of positions of the main spindle and/or the table based on said obtained displacement value, wherein
    said measuring tool is formed with the interrupting portion of the laser beam shaped as a portion of circular cone form, and
    said machine tool is controlled with correction of position being performed based on the obtained data.

2. A method for controlling a machine tool according to claim 1, wherein at least two pairs of said emitting element and said photosensitive element are provided and said laser beams are irradiated in the direction parallel to the upper face of said table respectively so as to cross each other substantially at center of the table which is viewed as a plane.

3. A method for controlling a machine tool according to claim 1, wherein each pair of said emitting element and said photosensitive element is provided as a single unit and plurality of units of said emitting element and said photosensitive element are provided on the upper face of the table.

4. A method for controlling a machine tool according to any of claims 1 to 3, wherein said step of interrupting the laser beam is arranged so that said relative movement is made for each one of said laser beams in X axis direction, Y axis direction or direction combined thereof, said measuring tool interrupts said laser beam from one side in a direction, the position at the moment of interruption is measured, said measuring tool further interrupts said laser beam in said direction from the opposite side to said one side and the position at the moment of interruption is measured.

5. An apparatus for controlling a machine tool in which a work mounted on a table is machined through relative movement in X, Y and Z axis directions between the table and a main spindle, comprising:
    measuring means containing an emitting element and a photosensitive element provided on said table in which laser beam is irradiated from said emitting element towards said photosensitive element,
    a measuring tool which is formed with an interrupting portion of the laser beam shaped as a portion of circular cone form and is attached to said main spindle and can move towards the laser beam in the direction substantially at right angle therewith a relative movement between the measuring tool and the table and interrupt said laser beam, delivering means of detection signal of interruption generated at the moment when said measuring tool has interrupted said laser beam, position detecting means for detecting coordinate values for said respective three axes upon receiving said detection signal of interruption, and operating means in which operation processing of the difference between said measured coordinate value for each of the three axes and the measured coordinate value for each of the three axes measured before similarly is performed so as to obtain a displacement value between said main spindle and said table and the values for correction of positions of the main spindle and/or the table based on said obtained displacement value, wherein said machine tool is controlled with measurement of position being performed based on the obtained data.

6. An apparatus for controlling a machine tool according to claim 5, wherein at least two pairs of said emitting element and said photosensitive element are provided and said laser beams are irradiated in the direction parallel to the upper face of said table respectively so as to cross each other substantially at center of the table which is viewed as a plane.

7. An apparatus for controlling a machine tool according to claim 5, wherein each pair of said emitting element and said photosensitive element is provided as a single unit and plurality of units of said emitting element and said photosensitive element are provided on the upper face of the table.

8. An apparatus for controlling a machine tool according to any of claims 5 to 7 wherein during the interruption of said laser beam said relative movement is made for each one of said laser beams in X axis direction, Y axis direction or direction combined thereof, said measuring tool interrupts said laser beam from one side in a direction, the position at the moment of interruption is measured, said measuring tool further interrupts said laser beam in said direction from the opposite side to said one side and the position at the moment of interruption is measured.

* * * * *